United States Patent
De la Broise et al.

(10) Patent No.: US 10,652,844 B1
(45) Date of Patent: May 12, 2020

(54) PAGING AUTO-ACKNOWLEDGEMENT

(71) Applicant: MARVELL INTERNATIONAL LTD., Hamilton (BM)

(72) Inventors: Josselin De la Broise, Mountain View, CA (US); Neeta Srivastav, Los Gatos, CA (US)

(73) Assignee: MARVELL ASIA PTE. LTD., Singapore (SG)

( * ) Notice: Subject to any disclaimer, the term of this patent is extended or adjusted under 35 U.S.C. 154(b) by 724 days.

(21) Appl. No.: 14/583,899

(22) Filed: Dec. 29, 2014

Related U.S. Application Data (60) Provisional application No. 61/924,362, filed on Jan. 7, 2014.

(51) Int. Cl.
| | | |
|---|---|---|
| *H04L 5/00* | (2006.01) | |
| *H04L 1/18* | (2006.01) | |
| *H04W 56/00* | (2009.01) | |
| *H04L 1/16* | (2006.01) | |
| *H04W 28/02* | (2009.01) | |
| *H04W 4/80* | (2018.01) | |

(52) U.S. Cl.
CPC ......... *H04W 56/001* (2013.01); *H04L 1/1678* (2013.01); *H04W 4/80* (2018.02); *H04W 28/0236* (2013.01)

(58) Field of Classification Search
CPC H04B 1/713; H04W 56/001; H04W 28/0236; H04W 4/008; H04L 1/1678
See application file for complete search history.

(56) References Cited

U.S. PATENT DOCUMENTS

| | | | | |
|---|---|---|---|---|
| 8,976,835 | B2* | 3/2015 | Sarca | H04B 1/713 |
| | | | | 370/252 |
| 2007/0287418 | A1* | 12/2007 | Reddy | H04W 12/00 |
| | | | | 455/410 |
| 2009/0201851 | A1* | 8/2009 | Kruys | H04W 16/14 |
| | | | | 370/328 |
| 2010/0036463 | A1* | 2/2010 | Bange | A61N 1/37223 |
| | | | | 607/60 |
| 2011/0075704 | A1* | 3/2011 | Bettendorff | H04B 1/713 |
| | | | | 375/133 |
| 2012/0237053 | A1* | 9/2012 | Alam | H04L 12/00 |
| | | | | 381/80 |
| 2013/0107772 | A1* | 5/2013 | Splitz | H04W 56/0015 |
| | | | | 370/311 |

(Continued)

*Primary Examiner* — Charles C Jiang
*Assistant Examiner* — Voster Preval (57) ABSTRACT

Systems, methods, and other embodiments associated with paging auto-acknowledgement are described. According to one embodiment, a method for performing paging auto-acknowledgement includes transmitting according to a protocol, on a first channel, a synchronization packet to a slave device, where the synchronization packet specifies a second channel on which a subsequent packet will be transmitted to the slave device. The protocol specifies that the slave device send an acknowledgement to the synchronization packet on the first channel prior to switching to the second channel. The method includes, when predetermined automatic acknowledgement criteria are met, transmitting the subsequent packet to the slave device on the second channel in the absence of an acknowledgement to the synchronization packet from the slave device.

17 Claims, 7 Drawing Sheets

(56) References Cited

U.S. PATENT DOCUMENTS

| | | | |
|---|---|---|---|
| 2013/0109319 A1* | 5/2013 | Splitz | H04W 4/70 455/63.1 |
| 2013/0294388 A1* | 11/2013 | Kawasaki | H04L 1/0045 370/329 |
| 2014/0194062 A1* | 7/2014 | Palin | H04W 24/00 455/41.2 |

* cited by examiner

PAGING AUTO-ACKNOWLEDGEMENT

CROSS REFERENCE TO RELATED APPLICATIONS

This patent disclosure claims the benefit of U.S. Provisional Pat. App. Ser. No. 61/924,362 filed on Jan. 7, 2014, which is hereby wholly incorporated by reference.

BACKGROUND

The popularity of multiple wireless communication technologies for handheld platforms has created a need to integrate multiple wireless communication technologies on a single wireless communication device. In many electronic devices such as smartphones, both ISM and MWS technologies are implemented in a same device. For example, a smartphone may employ LTE for transmitting and receiving data, and Bluetooth for communicating with a headset.

The frequency bands of some of these wireless communication technologies are close enough to result in interference. For example, an un-licensed 2.4 GHZ Industrial, Scientific and Medical (ISM) frequency band is adjacent to some of the bands used by Mobile Wireless Standards (MWS) technologies such as Long Term Evolution (LTE), which often results in adjacent channel interference. Thus, LTE transmissions from the smartphone may cause adjacent channel interference with incoming Bluetooth signals.

SUMMARY

In general, in one aspect this specification discloses an apparatus that includes a transceiver and an auto-ACK logic. The auto-ACK logic is configured to, according to a protocol, cause the transceiver to transmit, on a first channel, a synchronization packet to a slave device, where the synchronization packet specifies a second channel on which a subsequent packet will be transmitted to the slave device. The protocol specifies that the slave device send an acknowledgement to the synchronization packet on the first channel prior to switching to the second channel. When predetermined automatic acknowledgement criteria are met, the auto-ACK logic is configured to cause the transceiver to transmit the subsequent packet to the slave device on the second channel in the absence of an acknowledgement to the synchronization packet from the slave device.

In general, in another aspect, this specification discloses a method for performing paging auto-acknowledgement. The method includes transmitting according to a protocol, on a first channel, a synchronization packet to a slave device, where the synchronization packet specifies a second channel on which a subsequent packet will be transmitted to the slave device. The protocol specifies that the slave device send an acknowledgement to the synchronization packet on the first channel prior to switching to the second channel. The method includes, when predetermined automatic acknowledgement criteria are met, transmitting the subsequent packet to the slave device on the second channel in the absence of an acknowledgement to the synchronization packet from the slave device.

In general, in another aspect, this specification discloses an integrated circuit device that includes a first integrated circuit, a second integrated circuit, and a third integrated circuit. The first integrated circuit includes an antenna configured to send and receive signals in the ISM frequency band. The second integrated circuit includes a Bluetooth transceiver configured to communicate by way of the antenna. The third integrated circuit includes hardware embodying auto-ACK logic. The auto-ACK logic is configured to cause the transceiver to transmit, on a first channel, a synchronization packet to a slave device, where the synchronization packet specifies a second channel on which a subsequent packet will be transmitted to the slave device; determine whether automatic acknowledgement criteria are met, where the automatic acknowledgement criteria are independent of communications received from the slave device; and when the automatic acknowledgement criteria are met, cause the Bluetooth transceiver to transmit the subsequent packet to the slave device on the second channel.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Systems and methods described herein facilitate Bluetooth based communication between wireless devices in a noisy environment by providing an auto-acknowledgement mechanism by which a master device paging a slave device can perform frequency hopping in the absence of an acknowledgement packet from the slave device. In the absence of the acknowledgement packet, and after certain criteria are met, the master device transitions to the next channel in the frequency hopping sequence. Usually the master device will be able to successfully communicate with the slave device in the next channel. Thus when noise, possibly from a collocated LTE transceiver, prevents reception of the acknowledgement packet from a slave device, the master device may still be able to connect to the slave device using frequency hopping.

Figure 1:
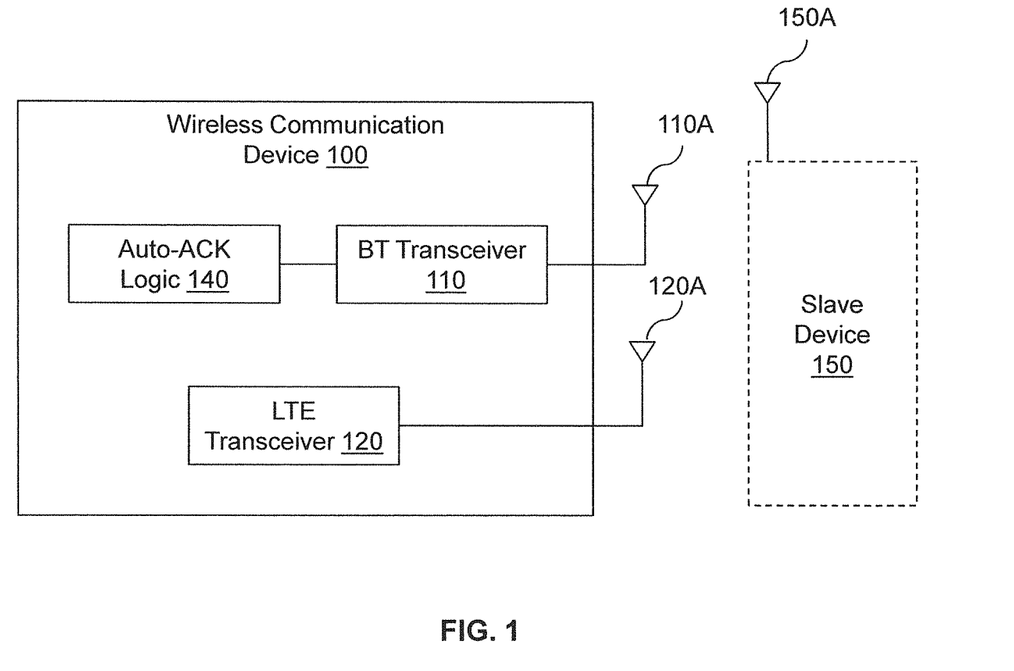
FIG. 1 illustrates one embodiment of an apparatus associated with paging auto-acknowledgement.

FIG. 1 illustrates one embodiment of a wireless communication device 100 that performs an auto-acknowledgement mechanism as discussed above, which is referred to herein as paging auto-acknowledgement (or paging auto-ACK). Although in the described embodiments, elements of the wireless device 100 are presented in one arrangement, other embodiments may feature other arrangements. For example, elements of the wireless device 100 can be implemented in hardware, software, or combinations thereof. The wireless device 100 can be implemented as any sort of electronic device capable of performing functions described herein. For example, the wireless device 100 can be implemented as a smartphone, tablet computer, or the like. Elements of the wireless device 100 can be implemented as one or more integrated circuits.

The wireless device 100 includes a Bluetooth (BT) transceiver 110 and an LTE transceiver 120. The LTE transceiver 120 transceives (that is, transmits and receives) wireless LTE signals according to an LTE schedule using one or more antennas 120A. The Bluetooth transceiver 110 transceives wireless Bluetooth signals according to a Bluetooth schedule using one or more antennas 110A. In some embodiments, one or more of the antennas 110A, 120A can be combined. The Bluetooth transceiver 110 and the LTE transceiver 120 can be implemented as one or more integrated circuits.

A slave device 150 is shown in FIG. 1. The slave device 150 is remote (e.g., not connected by wire) with respect to the wireless communication device 100. The slave device 150 is configured to communicate with the wireless communication device 100 using Bluetooth protocols as will be described in more detail below.

The Bluetooth schedule and LTE schedule are configured to prevent interference between LTE signals and Bluetooth signals. In other embodiments, other measures are taken to avoid interference between LTE signals and Bluetooth signals instead of, or in addition to, scheduling-related measures. However, interference still may occur, depending on the frequencies (e.g., channels) in use by the transceivers 110 and 120 at any given time. To mitigate the effects of interference and noise on Bluetooth communication, the wireless device 100 includes auto-ACK logic 140. As will be described in more detail below, the auto-ACK logic 140 is configured to control the transceiver 110 to perform a paging auto-ACK process to allow a wireless connection with the slave device 150 to be established even when an acknowledgement packet is not received from the slave device.

Figure 2:
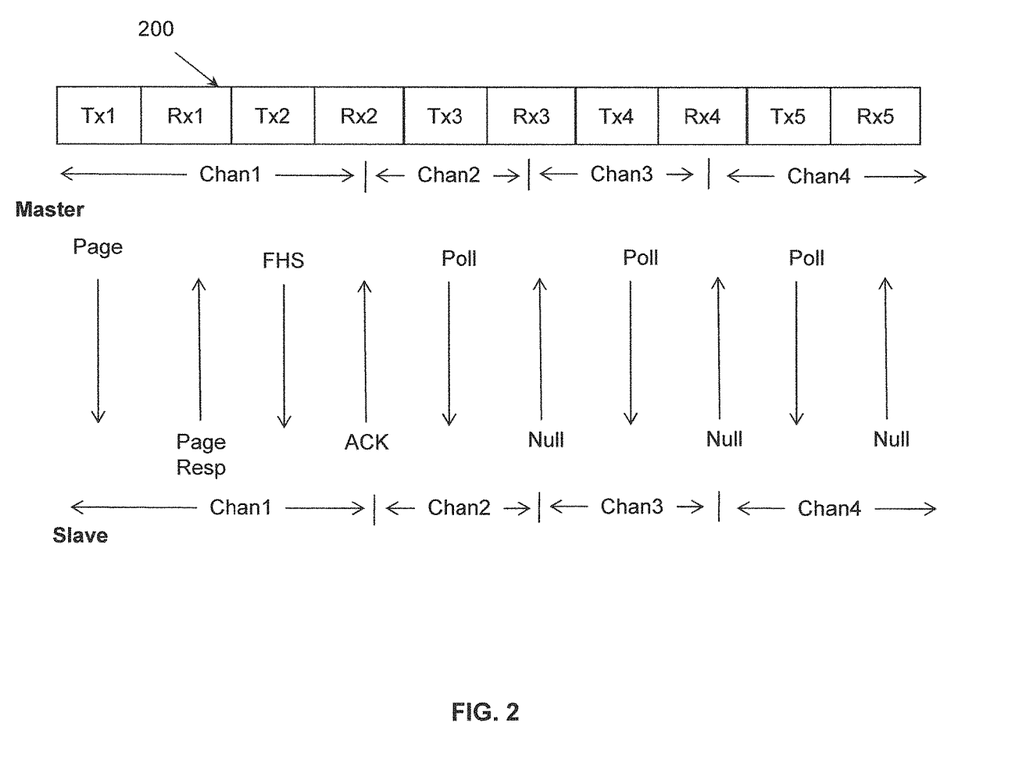
FIG. 2 illustrates an example of the establishment of a frequency hopping connection between a master device and a slave device.

Referring to FIG. 2, the Bluetooth schedule is shown at 200, and consists of alternating transmit time slots TX1-TX5 and receive time slots RX1-RX5.The Bluetooth transceiver 110 is allowed to begin transmitting Bluetooth signals only during a transmit time slot TX. In one implementation, all receive time slots RX and transmit time slots TX respectively have the same duration of 625 μs. In the described embodiments, the Bluetooth transceiver 110 acts as a Bluetooth master device that initiates and controls communication with a slave device (e.g., the slave device 150). For simplicity, each packet in FIG. 2 is illustrated as occupying a single time slot. A Bluetooth packet can occupy 1, 3, or 5 time slots. A Bluetooth packet that occupies 3 or 5 time slots is referred to as a "multi-slot" packet.

According to the Bluetooth protocol, packets sent by the master device must begin in a transmit time slot TX. Packets sent by the slave device must begin in a receive time slot RX. A slave device sends packets only in response to a packet transmitted by the master device, and starting only in the time slot following the received packet. The master device and the slave device utilize frequency hopping synchronization (FHS) or adaptive frequency hopping (AFH) to communicate. These techniques will be described briefly below.

Frequency Hopping Synchronization and Adaptive Frequency Hopping

FHS employs a random frequency hopping protocol. In FHS Bluetooth devices use 79 of the 83.5 available channels in the 2.4 GHz band, hopping across these channels in a random fashion and at a rate of 1600 times per second. As soon as another wireless device is introduced into the environment this type of hopping results in occasional collisions.

Version 1.2 of the Bluetooth Specification, adopted in 2003,includes Adaptive Frequency Hopping. In contrast to FHS, the AFH protocol allows Bluetooth devices to adapt to the environment by identifying fixed sources of interference and excluding them from the list of available channels. This process of re-mapping also involves reducing the number of channels to be used by Bluetooth. The Bluetooth Specification requires a minimum set of at least twenty channels.

To further improve resilience against frequency static interferers like LTE devices, the AFH protocol requires that Bluetooth devices communicate using the same channel. Normally, slave devices respond using another frequency channel than that used by the master device. With AFH, however, both master and slave communicate over the same frequency channel. This is done to avoid instances where the master device transmits on a "good" channel while the slave device responds on a "bad" channel (or vice versa), as this would lead to several retransmissions.

The Bluetooth transceiver 110 includes a Bluetooth radio that is a hybrid spread spectrum radio. Typically, the Bluetooth radio operates in a frequency-hopping manner in which the 2.4 GHz ISM band is broken into 79 1 MHz channels that the Bluetooth radio hops through, according to a pseudo-random sequence calculated according to the FHS protocol or AFH protocol, while transmitting and receiving data.

To form a connection, the master device needs to understand two parameters: the hopping pattern of the slave device it wishes to connect to and the phase within that pattern. Bluetooth devices each have a unique "Global ID" that is used to create a hopping pattern. In forming a piconet, the master device shares its Global ID with the other device, which then becomes slave to the master device. The master device provides the slave device with the correct hopping pattern. The master device also shares its clock offset with the slave, which determines the offset into the hopping pattern. This information is exchanged via an FHS packet.

Normally, Bluetooth devices not connected to the piconet exist in "Standby" mode. In this mode, the Bluetooth devices are listening for other Bluetooth devices to find them ("Inquire") and/or are listening for a request to form a piconet ("Page"). When a Bluetooth device issues an Inquire command, listening Bluetooth devices will respond with their FHS packet (Global ID and clock offset), providing the inquiring device with a list of Bluetooth device in the area.

The device discovery and connection establishment procedure begins when a Bluetooth device enters the inquiry state to discover other Bluetooth devices. The Bluetooth specification defines inquiry access codes that allow a device to specify the type of device it is seeking, such as PDAs, printers, or LAN access points. During inquiry, Bluetooth devices generate an inquiry hopping (channel changing) sequence. This inquiry hopping sequence is derived from the master device's clock and the chosen inquiry access code. The hopping sequence covers a 32-channel subset of the available 79 Bluetooth channels. Once a master device generates an inquiry hopping sequence, the master device broadcasts inquiry messages as the master device sequentially switches to each channel defined in the hopping sequence.

Discoverable devices will periodically enter the inquiry scan state. In this state, devices hop according to the inquiry scan hopping sequence, which is also based on the inquiry access code and the local clock. If a device performing the inquiry scan receives an inquiry message, the device enters the inquiry response state and replies with an inquiry response message. The inquiry response includes (i) the Bluetooth address of the remote device, and (ii) a clock (or timing) associated with the remote device, both of which are needed to establish a Bluetooth connection. All discoverable devices within the 10-meter broadcast range will respond to the device inquiry. This typically requires the master device to select the desired Bluetooth device from a list of discovered devices.

After obtaining a Bluetooth address of a selected slave device, the master device enters the paging state to establish a connection with the slave device. The sequence of communication that occurs during the paging state is illustrated in FIG. 2. Both the master device and the slave device start out communicating in one of the Bluetooth channels, labeled "Chan1" in FIG. 2. The master device sends a page packet to the slave device that includes the identification of the master device. When the slave device receives the page packet, the slave device responds to the master device with a page response packet on the same channel (e.g., Chan1). Upon receiving the page response, the master device sends an FHS packet to the slave device in the initial channel (e.g., Chan1). The FHS packet includes the Bluetooth address of the master device and the clock associated with the master device.

Once the slave device receives the FHS packet, the slave device sends, in the initial channel (e.g., Chan1), an acknowledgement packet (ACK) to the master. The slave device then uses the Bluetooth address of the master and the master's clock to generate a hopping sequence. At this point, the slave device switches to the next channel (e.g., "Chan2"), as specified by the hopping sequence. When the master device receives the ACK, the master device generates a hopping sequence from its own address and its own clock that is identical to the hopping sequence of the slave device. The master device then switches to the next channel as specified by the hopping sequence (e.g., "Chan2"). The identical hopping sequences allow the devices to hop on common channels while remaining connected.

Once the paging process is complete, the devices move to the connection state. The master device sends a poll packet to the slave device in the second channel and the slave device responds with a null packet in the same channel, verifying that the transition from the page hopping sequence to the new hopping sequence is successful. If successful, for the duration of the connection the two devices continue frequency hopping in a pseudo-random pattern based on the Bluetooth address of the master device and the clock associated with the master device. While for the purposes of the description, the channels are labeled Chan1-Chan4, the channels themselves are randomly selected. Thus, Chan1 is simply the first channel in the pseudo-random hopping sequence while Chan2 is the next channel in the pseudo-random hopping sequence, and so on.

Paging Auto-Acknowledgement

Figure 3:
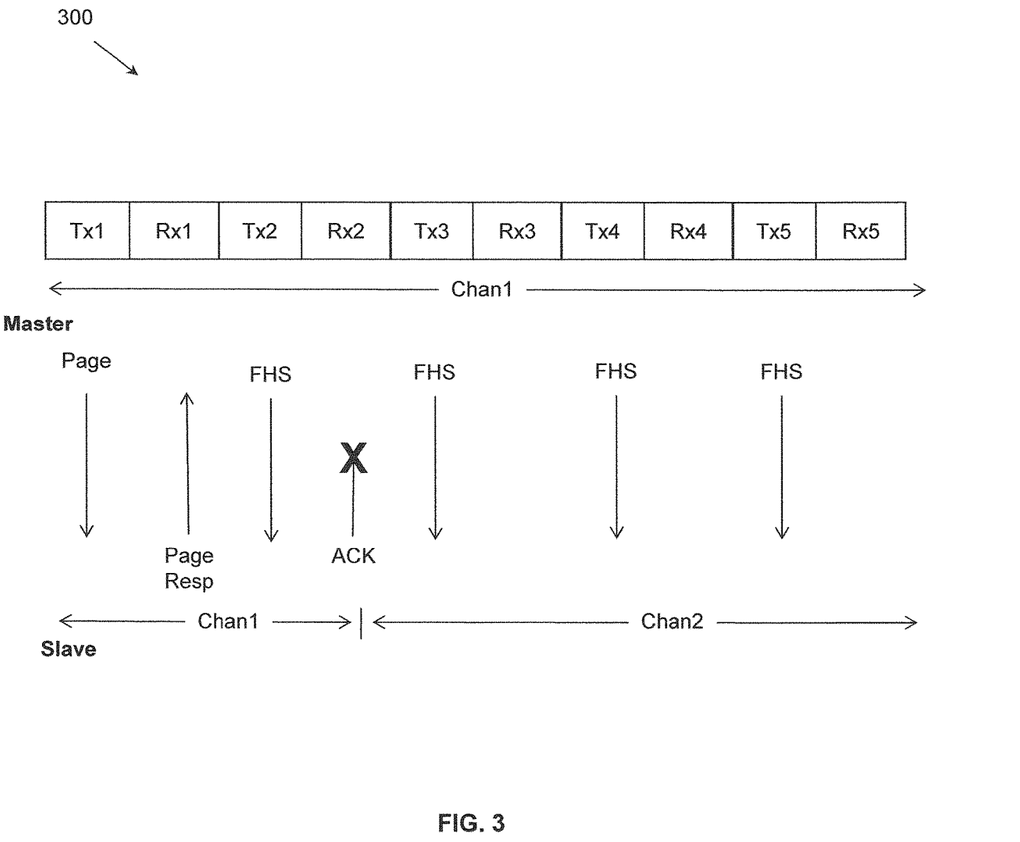
FIG. 3 illustrates a failed attempt to establish frequency hopping connection between a master device and a slave device.

FIG. 3 illustrates a paging scenario 300 in which a Bluetooth connection between a master device and a slave device fails. After obtaining a Bluetooth address of a selected slave device, the master device enters the paging state to establish a connection with the slave device. Both the master device and the slave device start out communicating in one of the Bluetooth channels, labeled "Chan1" in FIG. 3. The master device sends a page packet to the slave device that includes an identification of the master device. When the slave device receives the page packet, the slave device responds to the master device with a page response packet on the same channel (e.g., Chan1). Upon receiving the page response, the master device sends an FHS packet to the slave device in the initial channel (e.g., Chan1). The FHS packet includes both the Bluetooth address and the clock associated with the master device.

Once the slave receives the FHS packet, it sends an acknowledgement packet (ACK) to the master in the initial channel (e.g., Chan1). The slave then uses the master's address and the master's clock to generate a hopping sequence. At this point, the slave device switches to the next channel (e.g., "Chan2"), as specified by the hopping sequence.

In the scenario 300, the master device does not receive the ACK. In response to not receiving an ACK the master device re-transmits the FHS packet in the initial channel (e.g., Chan1). The slave device has already switched to the second channel (e.g., Chan2) and does not receive the re-transmitted FHS packet. Thus, the slave device does not send an ACK and the master device will continue periodically sending FHS packets in the initial channel until expiration of a time out period. After the time out period expires, the master device will re-enter the paging state and look for a new device with which to connect.

The scenario 300 may occur because noise or interference from a collocated transceiver prevents reception of the ACK in the initial channel, while communication in other channels in the frequency hopping sequence would be possible. This results in unnecessary delay in establishing a connection or in some circumstances, a failure to establish a connection that would otherwise be successful.

Figure 4:
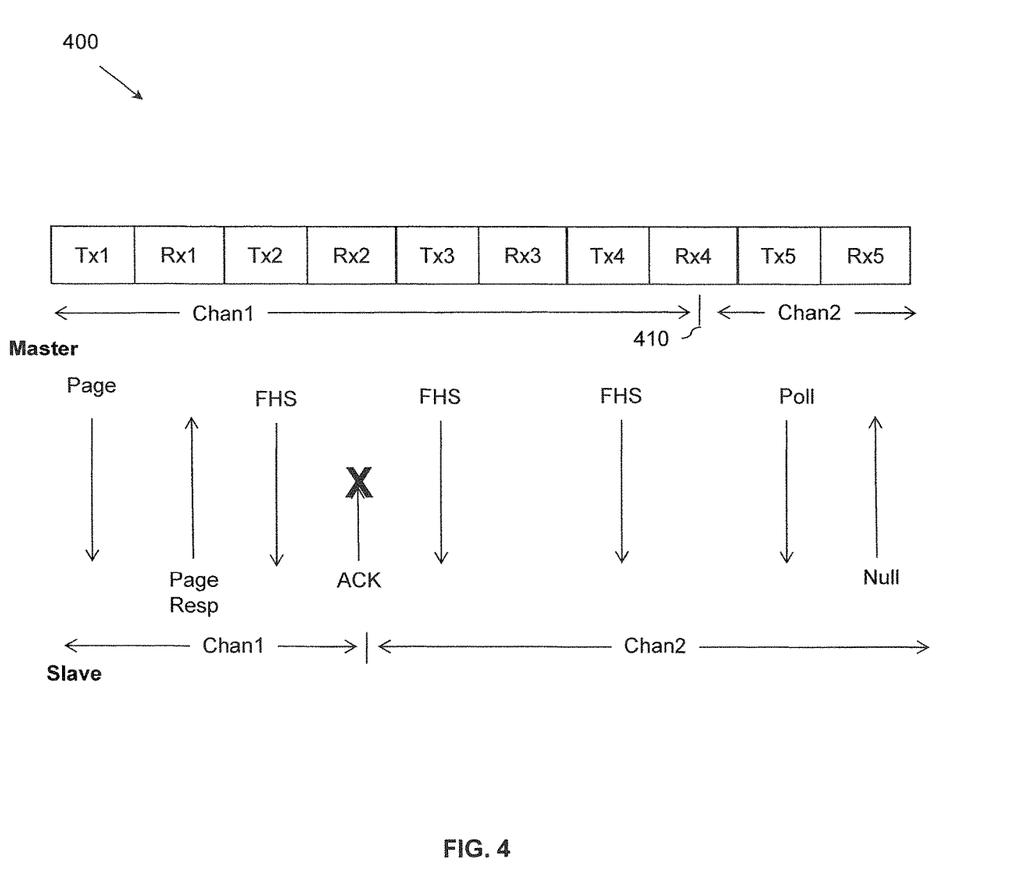
FIG. 4 illustrates an example of the establishment of a frequency hopping connection between a master device and a slave device utilizing on embodiment of paging auto-acknowledgement.

FIG. 4 illustrates a how one embodiment of the paging auto-ACK mechanism allows a connection to be established between a master device and a slave device even when interference or noise prevents the master device from receiving an ACK from the slave device. Referring momentarily back to FIG. 1, in one embodiment the auto-ACK logic 140 controls the Bluetooth transceiver 110 to perform paging auto-ACK. Returning to FIG. 4, as in the failed connection scenario 300 of FIG. 3, in the scenario 400 the master device does not receive the ACK. In response to not receiving an ACK the master device re-transmits the FHS packet in the initial channel (e.g., Chan1). The slave device has already switched to the second channel (e.g., Chan2) and does not receive the re-transmitted FHS packet. Thus, the slave device does not send an ACK.

In response to the failure to receive the ACK, the paging auto-ACK mechanism (e.g., the Bluetooth transceiver 110 controlled by the auto-ACK logic 140 of FIG. 1) will cause the master device, when certain criteria are met, to switch as indicated by 410 to the next channel in the frequency hopping sequence. The master device sends a polling packet in the next channel to the slave device and receives a null packet response, establishing connection with the slave device in the next channel. If the master device does not receive a null packet, at this point the auto-ACK logic 140 may determine that the connection has not been established and cause the master device to re-enter the paging state.

In the example shown in FIG. 4, the criteria for automatically switching to the next channel include the master device sending the FHS packet a total of three times without receiving an ACK. Other or additional criteria, including more or fewer re-transmittals of the FHS packet, observed noise in the initial channel, the presence of a collocated LTE or other transceiver, and so on, can be used.

Thus, instead of re-entering the paging state after the time out period expires, the master device will instead switch to the next channel in the frequency sequence and, in many instances, be able to establish a connection with the slave device. Of course, if an ACK is received in response to a re-transmittal of the FHS packet, the master device may switch immediately to the next channel in the frequency hopping sequence.

Figure 5:
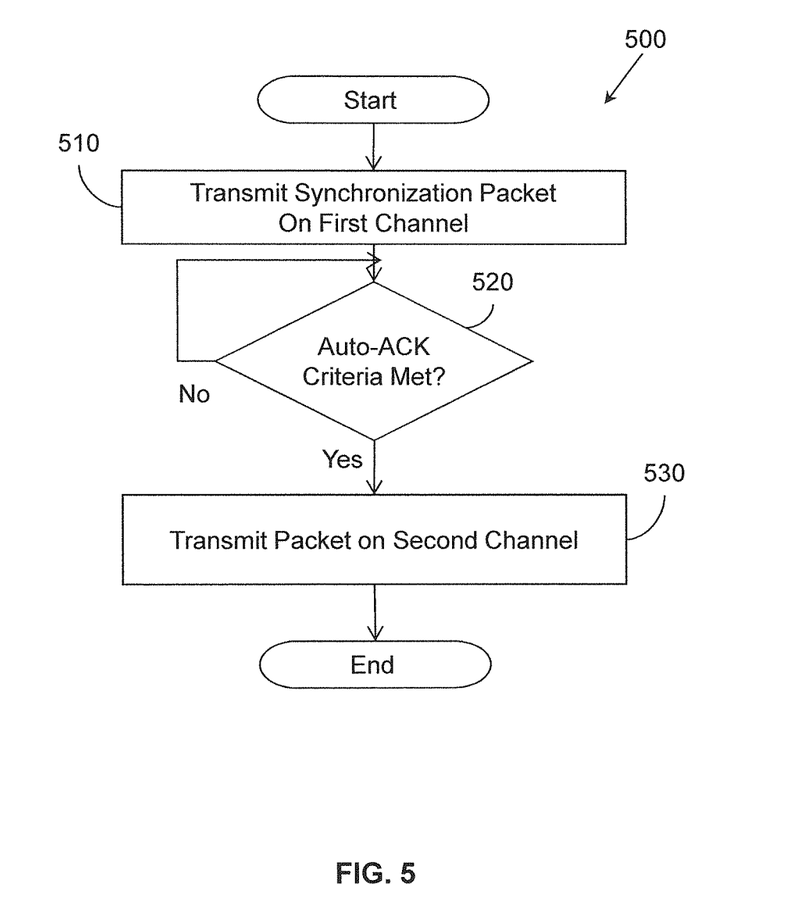
FIG. 5 illustrates one embodiment of a method associated with paging auto-acknowledgement.

FIG. 5 illustrates one embodiment of method 500 for providing a paging auto-ACK mechanism. The method 500 may be performed by the auto-ACK logic 140 of FIG. 1. The method includes, at 510, a master device transmitting according to a protocol, on a first channel, a synchronization packet to a slave device. The synchronization packet specifies a second channel on which a subsequent packet will be transmitted to the slave device. The protocol specifies that the slave device should send an acknowledgement to the synchronization packet on the first channel prior to switching to the second channel. At 520, a determination is made as to whether automatic acknowledgement criteria are met. If the automatic acknowledgement criteria are met, at 530, the method includes the master device transmitting the subsequent packet to the slave device on the second channel. Thus, the switching by the master device to the second channel does not have to depend on receiving the ACK from the slave device, but rather can be performed, even in the absence of the ACK, based on other criteria.

Figure 6:
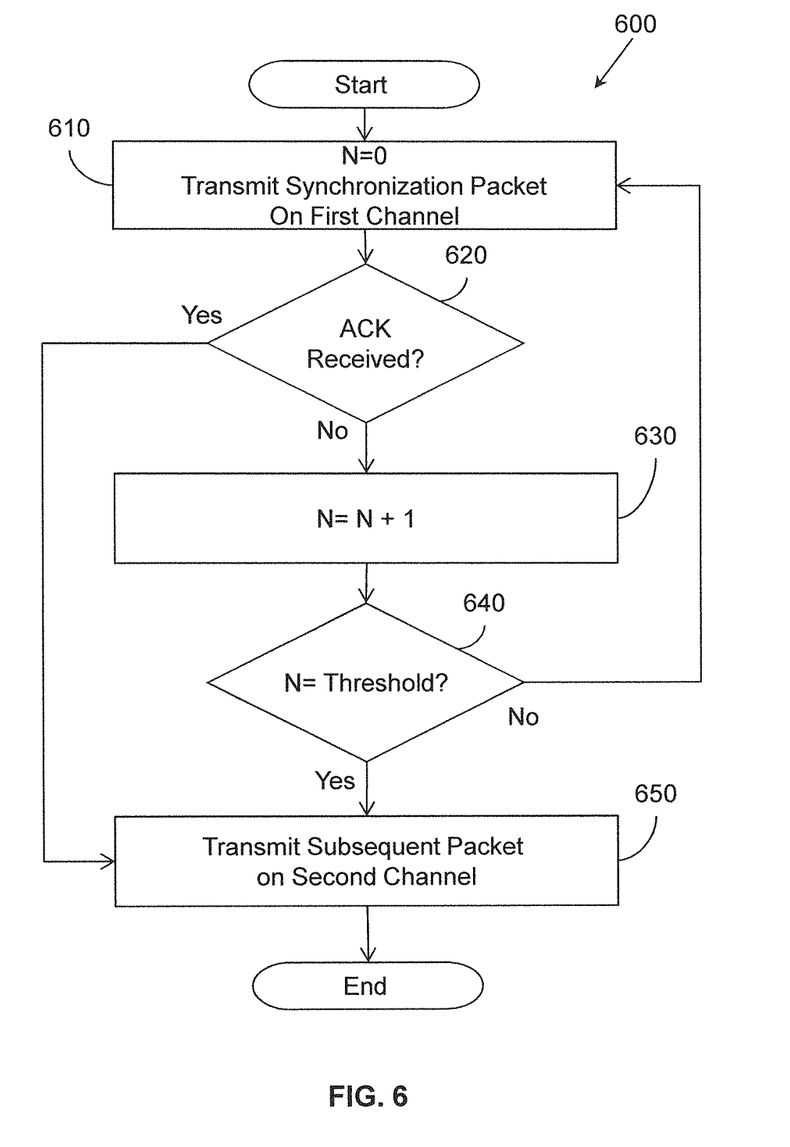
FIG. 6 illustrates another embodiment of a method associated with paging auto-acknowledgement.

FIG. 6 illustrates another embodiment of method 600 for providing a paging auto-ACK. The method 600 may be performed by the auto-ACK logic 140 of FIG. 1. The method includes, at 610, transmitting according to a protocol, on a first channel, a synchronization packet to a slave device. The synchronization packet specifies a second channel on which a subsequent packet will be transmitted to the slave device. The protocol specifies that the slave device should send an acknowledgement to the synchronization packet on the first channel prior to switching to the second channel.

At 620, a determination is made as to whether an ACK is received by the master device. If an ACK is received, the method continues to 650 and the subsequent packet is transmitted on the second channel to the slave device. If an ACK is not received, the method includes, at 630, incrementing a counter N that counts the number of times the synchronization packet has been sent without receiving an ACK. At 640, a determination is made as to whether N is equal to a threshold, meaning that the synchronization packet has been sent, without acknowledgement, a certain number of times. In one embodiment, the number N is four, but any number could be used as a threshold. If the number N is equal to the threshold, at 650, the method includes the master device transmitting the subsequent packet to the slave device on the second channel. Thus, the switching by the master device to the second channel does not have to depend on receiving the ACK from the slave device, but rather can be performed, even in the absence of the master device receiving an ACK, after a predetermined number of re-transmittals of the synchronization packet has occurred.

In one embodiment, the method 600 includes determining whether a response to the subsequent packet is received by the master device from the slave device on the second channel. When a response is not received, the method includes the master device ceasing the transmitting of packets on the second channel to the slave device.

Figure 7:
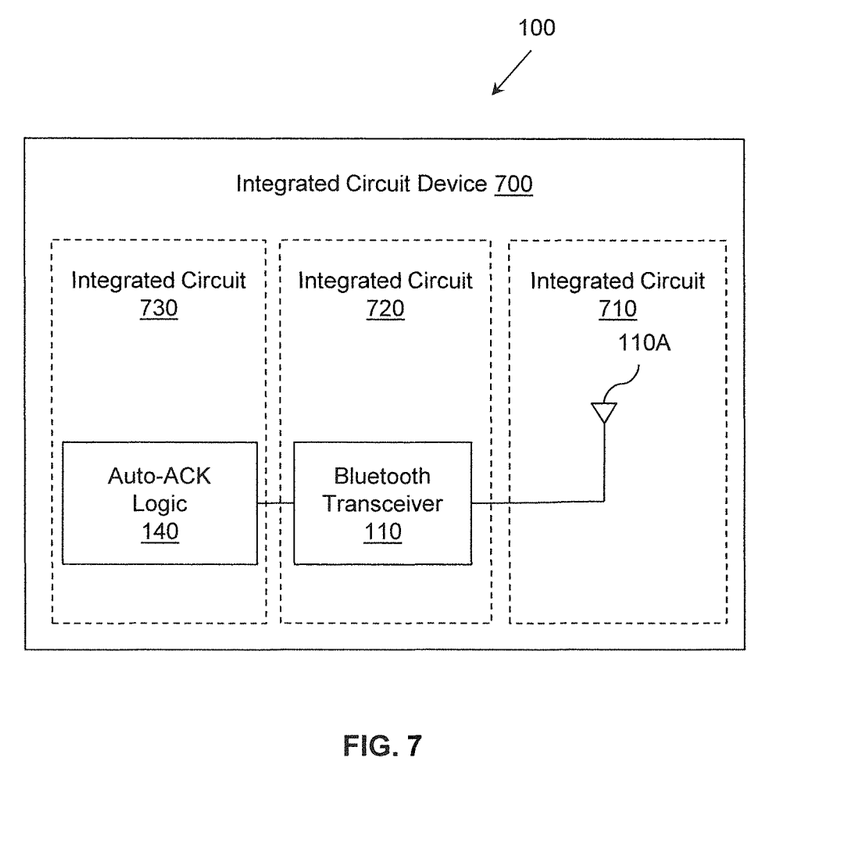
FIG. 7 illustrates one embodiment of an integrated circuit associated with paging auto-acknowledgement.

FIG. 7 illustrates one embodiment of an integrated circuit device 700 that performs paging auto-acknowledgement. The device 700 is one embodiment of the wireless device 100 of FIG. 1. Where appropriate, components in FIG. 7 will be labeled with their respective labels used in FIG. 1. The device 700 includes a first integrated circuit 710 that includes an antenna 110A configured to send and receive signals in the ISM frequency band. The device 700 includes a second integrated circuit 720 that includes a Bluetooth transceiver 110 configured to communicate by way of the antenna. The device 700 includes a third integrated circuit 730 that includes hardware embodying auto-ACK logic 140. The auto-ACK logic 140 is configured to cause the transceiver to transmit, on a first channel, a synchronization packet to a slave device, where the synchronization packet specifies a second channel on which a subsequent packet will be transmitted to the slave device. The auto-ACK logic 140 determines whether automatic acknowledgement criteria are met and when the automatic acknowledgement criteria are met, causes the Bluetooth transceiver to transmit the subsequent packet to the slave device on the second channel. The auto-acknowledgement criteria are independent of communications received from the slave device.

In one embodiment, the auto-ACK logic 140 is configured to i) control the Bluetooth transceiver according to a protocol that specifies that the slave device send an acknowledgement to the synchronization packet on the first channel prior to switching to the second channel; and ii) cause the Bluetooth transceiver to transmit the subsequent packet to the slave device on the second channel in the absence of an acknowledgement to the synchronization packet from the slave device.

In various embodiments, the paging auto-acknowledgement criteria include one or more of: i) the transmittal of the synchronization packet a predetermined number of times without receiving an ACK; ii) observed noise in the initial channel; or iii) the presence of another transceiver in the integrated circuit device.

As can be seen from the foregoing description, the systems and methods described herein facilitate Bluetooth based communication between wireless devices in a noisy environment by providing a paging auto-acknowledgement mechanism by which a master device paging a slave device can perform frequency hopping in the absence of an acknowledgement packet from the slave device. Thus when noise, possibly from a collocated LTE transceiver, prevents reception of the acknowledgement packet from a slave device, the master device may still be able to connect to the slave device using frequency hopping.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium" as used herein is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C § 101.

"Logic" as used herein includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C § 101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C § 101.

To the extent that the term "includes" or "including" is employed in the detailed description or the claims, it is intended to be inclusive in a manner similar to the term "comprising" as that term is interpreted when employed as a transitional word in a claim.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

What is claimed is:

1. An apparatus, comprising:
    a transceiver;
    auto-ACK logic for establishing a connection between the transceiver and a slave device based on a channel hopping sequence, the auto-ACK logic configured to, according to a protocol:
        cause the transceiver to transmit, on a first channel, a synchronization packet to the slave device, where the synchronization packet specifies a second channel on which a subsequent packet will be transmitted to the slave device and where the second channel is defined by the channel hopping sequence;
        wherein the protocol specifies that the slave device is to send an acknowledgement to the synchronization packet on the first channel prior to switching to the second channel and based on the acknowledgement being received by the transceiver, i) cause the transceiver to transmit the subsequent packet to the slave device on the second channel and ii) receive a response to the subsequent packet on the second channel to establish the connection between the transceiver and the slave device based on the channel hopping sequence; and
        when i) predetermined automatic acknowledgement criteria are met, and ii) no acknowledgment to the synchronization packet has been received by the transceiver on the first channel from the slave device, cause the transceiver to
            transmit the subsequent packet to the slave device on the second channel specified by the synchronization packet transmitted on the first channel, wherein the predetermined automatic acknowledgement criteria specify that the transceiver is to automatically switch from the first channel to the second channel specified by the synchronization packet transmitted on the first channel for transmitting the subsequent packet in response to a predetermined number of transmissions of the synchronization packet having occurred over the first channel without the transceiver having received the acknowledgement to the synchronization packet from the slave device, and
            based on transmission of the subsequent packet on the second channel, receive the response to the subsequent packet from the slave device on the second channel to establish the connection between the transceiver and the slave device on the second channel based on the channel hopping sequence.

2. The apparatus of claim 1, wherein the auto-ACK logic is configured to:
    when the acknowledgement to the synchronization packet is not received from the slave device, cause the transceiver to re-transmit, on the first channel, the synchronization packet to the slave device;
    determine whether a response to the re-transmitted synchronization packet has been received from the slave device; and
    when a response to the re-transmitted synchronization packet is received from the slave device, cause the transceiver to transmit the subsequent packet to the slave device on the second channel.

3. The apparatus of claim 1, wherein the synchronization packet is a channel hopping synchronization (FHS) packet.

4. The apparatus of claim 1, wherein the protocol is a Bluetooth paging protocol.

5. The apparatus of claim 1, wherein the synchronization packet specifies adaptive frequency hopping parameters used by the slave device to compute a series of channels on which to transmit packets.

6. The apparatus of claim 1, wherein the auto-ACK logic is configured to:

determine that the acknowledgement to the subsequent packet is not received from the slave device on the second channel; and when the acknowledgement to the subsequent packet is not received, cause the transceiver to cease transmitting packets on the second channel to the slave device.

7. A method, comprising:

transmitting, according to a protocol for establishing a connection between a transceiver and a slave device based on a channel hopping sequence, on a first channel, a synchronization packet to the slave device, where the synchronization packet specifies a second channel on which a subsequent packet will be transmitted to the slave device, wherein the second channel is defined by the channel hopping sequence;

wherein the protocol specifies that the slave device is to send an acknowledgement to the synchronization packet on the first channel prior to switching to the second channel and based on the acknowledgement being received by the transceiver, i) cause the transceiver to transmit the subsequent packet to the slave device on the second channel and ii) receive a response to the subsequent packet on the second channel to establish the connection between the transceiver and the slave device based on the channel hopping sequence; and when i) predetermined automatic acknowledgement criteria are met, and ii) no acknowledgment to the synchronization packet has been received by the transceiver on the first channel from the slave device, causing the transceiver to transmit the subsequent packet to the slave device on the second channel specified by the synchronization packet transmitted on the first channel, wherein the predetermined automatic acknowledgement criteria specify that the transceiver is to automatically switch from the first channel to the second channel specified by the synchronization packet transmitted on the first channel for transmitting the subsequent packet in response to a predetermined number of transmissions of the synchronization packet having occurred over the first channel without the transmitter having received the acknowledgement to the synchronization packet from the slave device, and based on transmission of the subsequent packet on the second channel, receive the response to the subsequent packet from the slave device on the second channel to establish the connection between the transceiver and the slave device based on the channel hopping sequence.

8. The method of claim 7, further comprising:

when the acknowledgement is not received from the slave device, re-transmitting, on the first channel, the synchronization packet to the slave device;

determining whether a response to the re-transmitted synchronization packet has been received from the slave device; and when a response to the re-transmitted synchronization packet is received from the slave device, transmitting the subsequent packet to the slave device on the second channel.

9. The method of claim 7, wherein the synchronization packet is a channel hopping synchronization (FHS) packet.

10. The method of claim 7, wherein the protocol is a Bluetooth paging protocol.

11. The method of claim 7, wherein the synchronization packet specifies adaptive frequency hopping parameters used by the slave device to compute a series of channels on which to transmit packets.

12. The method of claim 7, further comprising:

determining that the acknowledgement to the subsequent packet is not received from the slave device on the second channel; and when the acknowledgement to the subsequent packet is not received, ceasing the transmitting of packets on the second channel to the slave device.

13. An integrated circuit device comprising:

a first integrated circuit that includes an antenna configured to send and receive signals in at least an Industrial, Scientific and Medical (ISM) frequency band;

a second integrated circuit that includes a Bluetooth transceiver configured to communicate by way of the antenna; and a third integrated circuit that includes hardware embodying auto-ACK logic for establishing a connection between a transceiver and a slave device based on a channel hopping sequence, the auto-ACK logic configured to:

cause the transceiver to transmit, on a first channel, a synchronization packet to a slave device, where the synchronization packet specifies a second channel on which a subsequent packet will be transmitted to the slave device and where the second channel is defined by the channel hopping sequence, receive, by the transceiver, an acknowledgement to the synchronization packet on the first channel, and based on the acknowledgement being received i) cause the transceiver to transmit the subsequent packet to the slave device on the second channel; and ii) receive a response to the subsequent packet on the second channel to establish the connection between the transceiver and the slave device based on the channel hopping sequence;

determine whether automatic acknowledgement criteria are met, where the automatic acknowledgement criteria are independent of communications received from the slave device, and wherein the automatic acknowledgement criteria specify that the transceiver is to automatically switch from the first channel to the second channel specified by the synchronization packet transmitted on the first channel for transmitting the subsequent packet in response to a predetermined number of transmissions of the synchronization packet having occurred over the first channel without the transmitter having received acknowledgement to the synchronization packet from the slave device, and when i) the automatic acknowledgement criteria are met, and ii) no acknowledgment to the synchronization packet has been received by the transceiver on the first channel from the slave device, cause the Bluetooth transceiver to transmit the subsequent packet to the slave device on the second channel specified by the synchronization packet transmitted on the first channel without the transmitter having received the acknowledgement to the synchronization packet from the slave device; and based on transmission on the second channel, receive the response to the subsequent packet from the slave device on the second channel to establish the connection between the transceiver and the slave device based on the channel hopping sequence.

14. The integrated circuit device of claim 13, wherein the auto-ACK logic is configured to:
control the Bluetooth transceiver according to a protocol that specifies that the slave device is to send the acknowledgement to the synchronization packet on the first channel prior to switching to the second channel.

15. The integrated circuit device of claim 13, wherein the auto-ACK logic is further configured to:
when the acknowledgment is not received from the slave device, cause the Bluetooth transceiver to re-transmit, on the first channel, the synchronization packet to the slave device;
determine whether a response to the re-transmitted synchronization packet has been received from the slave device; and
when a response to the re-transmitted synchronization packet is received from the slave device, cause the Bluetooth transceiver to transmit the subsequent packet to the slave device on the second channel.

16. The integrated circuit device of claim 13, wherein the auto-ACK logic is further configured to:
determine that the acknowledgement to the subsequent packet is not received from the slave device on the second channel; and
when the acknowledgment is not received, cause the transceiver to cease transmitting packets on the second channel to the slave device.

17. The integrated circuit device of claim 13, wherein the automatic acknowledgement criteria include one or more of:
observed noise in the initial channel; or
the presence of another transceiver in the integrated circuit device.

* * * * *